3,763,278
OLEFINIC NITRILE-STYRENE COPOLYMERIZATION PROCESS
Russell K. Griffith, Chagrin Falls, Ohio, assignor to The Standard Oil Company, Cleveland, Ohio
No Drawing. Continuation-in-part of abandoned application Ser. No. 874,699, Nov. 6, 1969. This application Aug. 10, 1970, Ser. No. 62,655
Int. Cl. C08f 19/08, 15/22
U.S. Cl. 260—880 R                   5 Claims

ABSTRACT OF THE DISCLOSURE

Acrylonitrile and styrene are copolymerized in the presence of a preformed elastomer such as a butadiene-acrylonitrile copolymer in such a manner that the mole ratio of acrylonitrile to styrene in the polymerization mixture is maintained in a predetermined range and the resulting copolymer is composed of a predetermined mole ratio of polymerized acrylonitrile to styrene.

---

This is a continuation-in-part of my copending U.S. patent application Ser. No. 874,699 filed Nov. 6, 1969, now abandoned.

This invention relates to a novel process for the copolymerization of styrene and alkyl-substituted styrenes with an olefinic nitrile in the presence of a conjugated diolefin elastomer, and more partcularly pertains to a process for preparing in high conversions such materials which have superior physical properties by the copolymerization of styrenes and acrylonitrile in the presence of an elastomeric diolefin polymer.

Copolymers of acrylonitrile and styrene are well known. See, for instance, "Vinyl and Related Polymers" by C. A. Schildknecht, 1952, pp. 49–54. Graft copolymers of acrylonitrile and styrene or diolefin elastomers and particularly such copolymers containing a major proportion of styrene are also well known. The prior art copolymers of acrylonitrile and styrene and rubber-modified copolymers are generally composed of a complex mixture of copolymers and homopolymers of varying monomer compositions. Such copolymers contain fractions consisting almost entirely of acrylonitrile units, with only a few scattered styrene units along the chains, as well as fractions high in styrene and fractions containing styrene and/or acrylonitrile grated onto the rubber. Copolymers of styrene with 15–30 percent acrylonitrile have been of commercial interest for a number of years because some of these materials have higher softening temperatures, improved impact strength and greater stiffness than styrene homopolymers.

The polymers of this invention, on the other hand, result from a process in which a relatively high mole ratio of the olefinic nitrile to the styrene or alkyl-substituted styrene is maintained in the polymerization reaction, but the resulting interpolymer, whether it be in the grafted or ungrafted fraction, contains greater than equimolar ratios of polymerized olefinic nitrile to polymerized styrene or substituted styrene in them. The copolymers of this invention have markedly superior physical properties in relationship to prior art rubber-reinforced copolymers and homopolymers of each of the comonomers. The copolymers of this invention also have markedly superior physical properties when compared with the physical properties of blends of the homopolymers of each of the monomers.

The substituted styrenes useful in the instant invention include the nuclear and side-chain alkyl-substituted styrenes such as alpha-methyl styrene, alpha-ethyl styrene, the vinyl toluenes, the vinyl xylenes, the isopropyl styrenes such as o, m- and p-isopropyl styrenes, the t-butyl styrenes such as o-, m- and p-t-butyl styrenes, o-, m- and p-methyl alpha-methyl styrenes, and the like, and mixtures of same.

Diene elastomers useful in the present invention include rubbery homopolymers and copolymers of conjugated dienes having from 4 to 6 carbon atoms such as butadiene-1,3, isoprene, chloroprene, piperylene, and the like, and one or more of these dienes can be copolymerized with monomers such as acrylonitrile, methacrylonitrile, styrene, alpha-methyl styrene, ethyl acrylate, and the like. Most preferred conjugated dienes are butadiene-1,3 and isoprene and most preferred comonomers for the elastomer are acrylonitrile, methacrylonitrile and styrene. The diene elastomers useful in this invention preferably should contain 50 percent or more of polymerized diene.

Copolymers possessing the desired properties are obtained when the monomer mixture used in the polymerization process is maintained between about 5:1 to 200:1, and preferably between 20:1 to 150:1, molar ratio of olefinically unsaturated nitrile to substituted vinyl aromatic, respectively so that the final copolymeric compositions of this invention contain a molar ratio of from about 1:1 to 30:1, and preferably from about 1.4:1 to 18:1, of polymerized olefinically unsaturated nitrile to polymerized substituted vinyl aromatic monomer, respectively, exclusive of the diene elastomer included therein. The final copolymer is maintained within the foregoing composition ranges by either (1) carrying the copolymerization to low conversion or (2) carrying the copolymerization to higher conversion with continuously adding fresh vinyl aromatic monomer to the polymerization mixture as polymerization proceeds. Procedure (2) just described is the prefered method of this invention. The amount of diene elastomer in the final polymer will vary from about 1 percent by weight based on the total weight of final polymer to about 25 percent by weight of elastomer.

Copolymerization of the monomers in the presence of the rubber can be carried out by heating them while dispersed as droplets in an inert medium, i.e., in suspension in water, and at a temperature in the range of about 0° C. or below about 100° C. or above and at atmospheric, subatmospheric or superatmospheric pressure. Preferred because of convenience in handling and recovery of product is an aqueous emulsion or suspension process in which the monomers are copolymerized in the presence of an emulsion or suspension of the preformed rubber.

Catalysts which may be used in the copolymerization of the olefinically unsaturated nitrile and substituted vinyl aromatic monomer include the per-acid catalysts, such as persulfuric acid, peracetic acid and perphthalic acid; the per-salt catalysts such as potassium persulfate; the peroxide catalysts, such as hydrogen peroxide, benzoyl peroxide, chlorobenzoyl peroxide, bromobenzoyl peroxide, naphthyl peroxide, acetyl peroxide, benzoyl acetyl peroxide, lauryl peroxide, succinyl peroxide, di-t-butyl peroxide, dicumyl peroxide, cumyl hydroperoxide, t-butyl peracetate, sodium peroxide, barium peroxide, t-alkyl hydroperoxides such as t-butyl hydroperxoide; azo catalysts such as azobisisobutyronitrile; and, if desired, mixtures of the polymerization initiators may be used. Radiation such as ultraviolet radiation, X-rays, nuclear radiation, etc., may also be used for the initation of the polymerization.

The polymerization can be carried to completion without substantial interruption or it may be stopped at any point short of completion. Unreacted polymerizable material may be separated from the polymer by any suitable method, such as filtration, extraction, distillation and the like. The polymerization may be accomplished in any suitable type of apparatus and may be conducted in a batch, semi-continuous or continuous manner.

A particularly preferred method for the copolymerization comprises an aqueous emulsion polymerization process wherein an aqueous emulsion of monomer is polymerized in admixture with an aqueous latex of the elastomer and additional styrene or substituted styrene is continuously added to the polymerization reaction to maintain the desired monomer ratio during the course of the reaction.

Emulsifying agents which may be used in the aqueous' emulsion polymerization process include the soaps, such as sodium and potassium myristate, laurate, palmitate, oleate, stearate, resinate, and hydroabietate; alkali metal alkyl or alkylene sulfonates, such as sodium and potassium lauryl sulfate, cetyl sulfate, oleyl sulfonate, stearyl sulfonate, sulfonated castor oil, as well as ammonium salts thereof; salts of higher amines such as lauryl amine hydrochloride and stearyl amine hydrobromide; and higher molecular weight materials such as sodium polyacrylate, methyl cellulose, etc.

Suitable molecular weight modifiers, such as the alkyl and aryl mercaptans, including n-dodecyl mercaptan, t-dodecyl mercaptan and the like, may be employed in the polymerization step in amounts of from about 0 percent to about 10 percent by weight based on the total weight of monomer-rubber material.

The product of the aqueous emulsion polymerization is usually a latex. The copolymers may be recovered from the latex by any suitable means, such as by coagulation with electrolytes or solvents, by freezing and the like.

Other modifiers, including plasticizers, stabilizers, lubricants, dyes, pigments, and fillers may be added during the polymerization process, provided they do not chemically react with or otherwise adversely affect the ingredients of the reaction mixture. Otherwise, these modifiers may be added following polymerization. Examples of other modifying agents and pigments which may be added are wood flour, wood fiber, paper dust, clay, glass wool, glass fiber, mica, granite dust, silk flock, cotton flock, steel wool, cloth, sand, carbon black, titanium dioxide, zinc oxide, lead oxide, chrome yellow, gums, oils, waxes, and the like.

Other compounding ingredients, such as extenders, stabilizers, colors and the like, may be used in preparing the compositions of this invention as is well known in the art so long as the balance between impact strength, flexural strength, tensile strength, processability, heat distortion temperature and the like are not affected to such a degree that the composition is no longer useful as a tough, rigid thermoplastic product.

The thermoplastic resins obtained from the copolymers produced by the process possess many of the ideal characteristics of the thermoplastic resins and at the same time possess excellent gas and vapor barrier porperties, very high heat distortion points, high tensile strengths, high flexural strengths, high degree of hardness, markedly high impact strengths, resistance to solvents and low degree of creep, which are more characteristic of the thermosetting resins. With such an excellent combination of properties the resins of the novel copolymers can be used for many purposes for which the known thermoplastic resins and thermosetting resins by themselves are entirely unsuited.

The compositions of this invention have excellent processing characteristics, and they may be extruded, calendered, molded, drawn, embossed, machined and otherwise treated to form colorless, translucent and in some cases transparent, useful, rigid, shock-resistant products and articles which have an excellent balance of good chemical, physical and electrical properties.

The compositions of this invention may be used to good advantage to make all sorts of useful extruded or molded (injection or compression) shapes, such as sheets, rods, tubes and the like, as well as milled or calendered sheets or the like which can also be after-formed by vacuum drawing or similar operations. They may be expanded by incorporating blowing agents and heating. Expanded and unexpanded sheets may be laminated. The compositions of this invention may be substituted to great advantage for the usual rubber or plastic compositions, or even for metals, wood or other materials, in many applications where toughness and resistance to creep and distortion at elevated temperatures are required. The resins are particularly useful in the production of articles and implements which must be subjected to relatively high heat for relatively long times, such as medical instruments and the like. Thus, the present compositions may be used to fabricate parts for machines, such as gears and cams; parts for textile machinery such as bobbins, shuttles, pickers, etc.; containers and pipes, especially for chemical and like operations where resistance to corrosive substances is desired, as in filter press plates and tumbling barrels for plating operations, electrical parts, such as terminal blocks, telephones, and protective casing for cable joints; as well as tote boxes and trays, luggage, radio cabinets, furniture, phonograph records, signs, small boat hulls and decks, paneling or covering for walls and sufaces of buildings, railroad cars or ships; protective armor including body armor; automobile parts such as headliners, steering wheels, door panels, and seat parts; roller skate wheels, protective helmets, packaging material for foods, drugs and cosmetics, including pressurized bottles and similar containers, printing plates, tools, die cutting blocks, washing machine parts such as covers, baskets, bearings and impellers; and numerous other articles as will be evident to those skilled in the art. The compositions of this invention may be laminated or otherwise reinforced as with fibers, fabrics or wire mesh if desired in making the foregoing or other articles, although frequently the strength of these materials will be adequate without reinforcement.

In the following examples which will further illustrate this invention, the amounts of ingredients are given in parts by weight unless otherwise indicated.

EXAMPLE 1

(A) An acrylonitrile-butadiene copolymer elastomer latex was prepared using the following ingredients:

| | Parts |
|---|---|
| Water | 200 |
| Butadiene-1,3 | 70 |
| Acrylonitrile | 30 |
| t-Dodecyl mercaptan | 0.65 |
| Versene Fe-3 (41 percent active) | 0.05 |
| Soap flakes | 1.40 |
| Daxad [1] flakes | 0.10 |
| Azobisisobutyronitrile | 0.40 |

[1] Dispersing agent—Sodium alkyl naphthalene sulfonate.

The polymerization was carried out with continuous agitation at 122° F. in the substantial absence of oxygen for 15 hours. The final latex had a total solids of 30.3 percent by weight.

(B) A copolymer of acrylonitrile and styrene was prepared in the presence of a portion of latex A above using the following ingredients:

| | Parts |
|---|---|
| Water | 419 |
| GAFAC RE-610 [1] | 6.3 |
| t-Dodecyl mercaptan | 0.6 |
| Azobisisobutyronitrile | 0.5 |
| Acrylonitrile | 91.05 |
| Styrene | 8.95 |
| Latex A from above | 21.64 |

[1] An emulsifier which is a mixture of

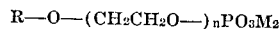

and [R—O—($CH_2CH_2O$—)$_n$]$_2PO_2M$ wherein $n$ is a number of from 1 to 40, R is an alkyl group or alkaryl group and preferably a nonyl phenyl group and M is hydrogen, ammonia or an alkali metal, which composition is sold by the General Aniline and Film Corporation.

The polymerization was carried out with continuous agitation at 60° C. under nitrogen. The acrylonitrile:styrene mole ratio was 20:1. During the polymerization period of 2 hours an additional 39.6 parts of styrene were pumped into the reaction mixture at such a rate that the acrylonitrile:styrene monomer mole ratio remained essentially constant at 20:1 during the entire polymerization period. The mole ratio of acrylonitrile:styrene monomer in the reaction medium was determined by intermittent gas chromatographic analysis. At the end of the polymerization period the mixture was coagulated in excess methanol. The polymer was isolated by filtration and dried at reduced pressure. A total of 96.5 parts (65.2 percent yield) of polymer was obtained. The polymer contained 11.9 percent nitrogen which corresponds to an acrylonitrile:styrene mole ratio of 1.61:1. Test bars of the polymer were prepared by compression molding at 190° C. under 5600 p.s.i.g. The test bars were found to have the temperature of 95° C., flexural strength of $16.3 \times 10^3$ p.s.i., flexural modulus of $3.99 \times 10^5$ p.s.i., tensile strength of $9.90 \times 10^3$ p.s.i., and notched Izod impact of 1.28 foot pounds per inch of notch.

The creep rate was determined on a test bar of polymer B using ASTM D-674. A plot of the creep modulus at 90° C. under 1000 p.s.i. load versus log time was extrapolated to give a "failure" time of 30 minutes. "Failure" was arbitrarily defined as a creep modulus of $0.5 \times 10^5$ p.s.i. or below.

(C) Procedure B of this example was repeated using a conventional polymerization procedure in which all of the acrylonitrile and styrene were charged initially in the polymerization reactor. The polymer was found to have a nitrogen content of 11.7 percent by weight corresponding to a acrylonitrile:styrene mole ratio of 1.55:1 and the polymer was obtained in 69.4 percent yield. The polymer was compression molded into test bars at 190° C. and 5600 p.s.i.g. and the physical properties of the test bars were found to be as follows: ASTM heat distortion temperature of 86° C., flexural strength of $11.8 \times 10^3$ p.s.i., flexural modulus of $3.8 \times 10^5$ p.s.i., tensile strength of $3.35 \times 10^3$ p.s.i. and notched Izod impact strength of 0.3 foot pound per inch.

The creep rate was determined on a test bar of polymer C using ASTM D-674 procedure. "Failure" occurred in less than 30 minutes.

EXAMPLE 2

(A) The procedure of Example 1-B was followed to produce a copolymer of acrylonitrile and p-t-butyl styrene in the presence of an acrylonitrile-butadiene elastomer latex employing the following recipe:

| | Parts |
|---|---|
| Water | 404 |
| GAFAC RE-610 | 6.06 |
| t-Dodecyl mercaptan | 0.6 |
| Azobisisobutyronitrile | 0.5 |
| Acrylonitrile | 89.25 |
| p-t-Butyl styrene | 10.75 |
| Latex A from Example 1 | 10.0 |

The acrylonitrile:p-t-butyl styrene mole ratio was 25:1 in the initial monomer charge. The polymerization reaction was carried out as in Example 1-B and an additional 56.7 parts of p-t-butyl styrene were added to the reaction mixture during the 160-minute reaction period. Compression molded test bars of this polymer were found to have the following physical properties: ASTM heat distortion temperature of 95° C., flexural strength of $12.6 \times 10^3$ p.s.i., flexural modulus of $3.4 \times 10^5$ p.s.i., tensile strength of $8.1 \times 10^3$ p.s.i., and notched Izod impact strength of 4.3 foot pounds per inch. A test bar of this polymer was subjected to the ASTM D-674 creep rate test at 90° C. under 1000 p.s.i. load. The bar was found to have a "failure" time of 45 minutes. This polymer was obtained in 65 percent yield (109 parts) and contained 9.56 percent of nitrogen which corresponds to an acrylonitrile-p-t-butyl styrene mole ratio of 1.72:1.

(B) Procedure A of this example was repeated except that all of the reactants were charged in the polymerization reactor initially. A total of 57.9 parts of polymer (54.4 percent yield) was obtained which contained 7.42 percent of nitrogen. The nitrogen analysis corresponds to an acrylonitrile:p-t-butyl styrene mole ratio of 1.18:1. Compression molded test bars of this polymer resin were found to have the following physical properties: ASTM heat distortion temperature of 94° C., flexural strength of $9.9 \times 10^3$ p.s.i., flexural modulus of $3.0 \times 10^5$ p.s.i., tensile strength of $7.0 \times 10^3$ ps.i., and notched Izod impact strength of 0.38 foot pound per inch. A test bar of this polymer was subjected to the ASTM D-674 creep rate test at 90° C. under 1000 p.s.i. load. The bar was found to have a "failure" time of less than ½ hour.

EXAMPLE 3

The procedure of Example 1-B was followed in the copolymerization of acrylonitrile and styrene in the presence of a styrene-butadiene copolymer latex using the following recipe:

| | Parts |
|---|---|
| Water | 419 |
| GAFAC RE-610 | 6.3 |
| t-Dodecyl mercaptan | 0.6 |
| Azobisisobutyronitrile | 0.5 |
| Acrylonitrile | 91.05 |
| Styrene | 8.95 |
| Styrene-butadiene rubber latex | 10.8 |

The styrene-butadiene latex contained 60 percent total solids and was composed of about 28 percent of styrene and 72 percent of butadiene. The polymerization was carried out at 60° C. in a nitrogen atmosphere. The molar ratio of acrylonitrile:styrene as charged was 20:1. The polymerization time was 130 minutes and during this time an additional 53 parts of styrene were fed to the reaction mixture. A total of 117.5 parts of polymer was obtained (73 percent yield) which was found to have a nitrogen content of 11.19 percent by weight which corresponds to an acrylonitrile:styrene mole ratio in the polymer of 1.44:1. Compression molded test bars of this polymer were found to have the following physical properties: ASTM heat distortion temperature of 97° C., flexural strength of $13.8 \times 10^3$ p.s.i., flexural modulus of $5.1 \times 10^5$ p.s.i., tensile strength of $8.2 \times 10^3$ p.s.i. and notched Izod impact strength of 4.1 foot pounds per inch. A test bar of the polymer was subjected to the ASTM D-674 creep rate test at 90° C. under 1000 p.s.i. load. The bar was found to have a "failure" time of 24 hours.

EXAMPLE 4

The procedure of Example 1-B was followed to prepare a cooplymer of acrylonitrile and styrene in the presence of a polybutadiene rubber latex. The following recipe was employed:

| | Parts |
|---|---|
| Water | 419 |
| GAFAC RE-610 | 6.3 |
| t-Dodecyl mercaptan | 0.6 |
| Azobisisobutyronitrile | 0.5 |
| Acrylonitrile | 91.05 |
| Styrene | 8.95 |
| Polybutadiene rubber latex | 10.8 |

The polybutadiene rubber latex had a total solids content of 60 percent by weight. The acrylonitrile:styrene mole ratio in the charge was 20:1. The polymerization was carried out at 60°C. in a nitrogen atmosphere. During the reaction period of 2 hours an additional 66 parts of styrene were added to the polymerization mixture. The polymer was obtained in 66.5 percent yield (115 parts). Compression molded test bars of this polymer were found to have the following physical properties: ASTM heat distortion temperature of 96° C., flexural strength of 14.5×10³ p.s.i., flexural modulus of 4.1×10⁵ p.s.i., tensile strength of 9.8×10³ p.s.i. and notched Izod impact strength of 0.3 foot pound per inch. A test bar of this polymer was subjected to the ASTM D-674 creep test at 90° C. and 1000 p.s.i. load. The bar was found to have a "failure" time of 12 hours.

EXAMPLE 5

(A) The procedure of Example 1-B was repeated to prepare an acrylonitrile-styrene copolymer in the presence of a nitrile rubber latex in which the ratio of acrylonitrile: butadiene was 35:65 using the following recipe:

| | Parts |
|---|---|
| Water | 540 |
| GAFAC RE-610 | 8 |
| t-Dodecyl mercaptan | 0.8 |
| Azobisisobutyronitrile | 0.6 |
| Acrylonitrile | 95.3 |
| Styrene | 4.7 |
| Acrylonitrile:butadiene (35:65) latex | 13.9 |

The acrylonitrile-butadiene elastomer latex had a total solids content of 60 percent by weight. The polymerization was carried out at a temperature of 60° C. in a nitrogen atmosphere. The charge mole ratio of acrylonitrile: styrene was 40:1. During the 160-minute reaction period an additional 25.3 parts of styrene were pumped into the polymerization reactor. A total of 89.3 patrs (66.7 percent yield) of polymer which had a nitrogen content of 13.4 percent by weight was obtained. The nitrogen content of this polymer corresponds to a molar ratio of acrylonitrile:styrene of 2.02:1. Compression molded test bars of this polymer were found to have the following physical properties: ASTM heat distortion temperature of 92° C., flexural strength of 12.6×10³ p.s.i., flexural modulus of 4.1×10⁵ p.s.i., tensile strength of 8.9×10³ p.s.i. and notched Izod impact strength of 2.50 foot pounds per inch. A test bar of this polymer was subjected to the ASTM D-674 creep rate test at 90° C. under 1000 p.s.i. load. The bar was found to have a "failure" time of 6 hours. Water vapor and oxygen transmission were determined on thin compression molded discs of this polymer. Water vapor transmission was found to be 9.9 grams/100 inches²/24 hours/mil at 25° C. Oxygen transmission was found to be 5.4 cc./inch²/24 hours/atmosphere/mil.

(B) Procedure A of this example was repeated except that all of the polymerization ingredients were charged initially to the polymerization reactor. The polymer, obtained in 71.7 percent yield, had a nitrogen content of 15.48 which corresponds to an acrylonitrile:styrene mole ratio of 2.7:1. Compression molded test bars of this polymer were found to have the following physical properties: ASTM heat distortion temperature of 88° C., flexural strength of 6.7×10³ p.s.i., flexural modulus of 3.6×10⁵ p.s.i., tensile strength of 6.9×10³ p.s.i., and notched Izod impact strength of 0.22 foot pound per inch. A test bar of this polymer was subjected to the ASTM D-674 creep rate test at 90° C. under 1000 p.s.i. load. The bar was found to have a "failure" time of 30 minutes.

EXAMPLE 6

The procedure of Example 1-B was followed to prepare a copolymer of acrylonitrile-styrene in the presence of a nitrile rubber (35:65 acrylonitrile:butadiene by weight) latex using the following recipe:

| | Parts |
|---|---|
| Water | 552 |
| GAFAC RE-610 | 8.3 |
| t-Dodecyl mercaptan | 0.83 |
| Acrylonitrile | 97.61 |
| Styrene | 2.39 |
| Acrylonitrile:butadiene rubber latex | 14.27 |
| Azobisisobutyronitrile | 0.64 |

The acrylonitrile-butadiene latex contained 60 percent by weight of solids. The polymerization was carried out as described in Example 1-B. A polymerization period of 270 minutes was employed and an additional 16.95 parts of styrene were required during the polymerization period to maintain an essentially constant acrylonitrile:styrene monomer ratio in the polymerization mixture. The polymer was obtained in 48 percent yield (60 parts) and was found to have a nitrogen content of 15.0 percent by weight which corresponds to a molar ratio of 2.58:1 of acrylonitrile:styrene in the polymer. Compression molded test bars of this polymer were found to have the following physical properties: ASTM heat distortion temperature of 83.5° C., flexural strength of 9.3×10³ p.s.i., flexural modulus of 2.8×10⁵ p.s.i., tensile strength of 6.3×10⁵ p.s.i., and notched Izod impact strength of 4.4 foot pounds per inch.

EXAMPLE 7

The procedure of Example 1-B was followed to prepare a copolymer of acrylontrile-styrene in the presence of a nitrile rubber latex of Example 1-A which had a total solids content of 31.6 percent by weight using the following recipe:

| | Parts |
|---|---|
| Acrylonitrile | 99 |
| Styrene | 1 |
| Water | 400 |
| Alipal 436 (emulsifier) | 4 |
| Nitrile rubber latex | 31.6 |
| t-Dodecyl mercaptan | 3.5 |
| Ammonium persulfate | 0.06 |

The polymerization was carried out at about 50° C. and styrene was added continuously at a rate sufficient to maintain the initial acrylonitrile:styrene monomer ratio (194:1), and this ratio was determined by periodic analysis of the monomer composition in the polymerization medium by gas chromatographic analysis. A total of 14 additional parts of styrene was required during the polymerization period of 270 minutes. The resin which was obtained in 78.5 percent yield was found to contain 20.85 percent nitrogen which corresponds to an acrylonitrile: styrene molar ratio of 7.34:1, respectively' The rubber phase of this resin constitutes about 11 percent of the resin. Compression molded bars of the resin were found to have the following physical properties: ASTM heat distortion temperature of 97° C. at 264 p.s.i., flexural strength of 19,100 p.s.i., tensile strength of 13,400 p.s.i., notched Izod impact strength of 1.5 foot pounds per inch of notch, Brabender torque (after 5 minutes) of 2,800 gram-meters.

Films of this resin were found to have an oxygen transmission rate of only 0.5 cc. mil/100 inches²/day/atmosphere.

The creep was determined on test bars of this resin using a flexural creep test in which the strains after 5 hours and 50 hours are calculated from the deflection in accordance with Federal Test Method Standards Nos. 406 and 1031, and are plotted against logarithmic time to yield a slope in inches/inch/log hours which represets that creep rate. The creep rate determined in this manner at 60° C. and 300 p.s.i. was found to be 0.018 percent.

I claim:
1. The process for preparing copolymer resins comprising polymerizing in an aqueous emulsion a mixture of (A) acrylonitrile and styrene wherein the acrylonitrile:styrene molar ratio is maintained between 20:1 to 150:1 and (B) a diene elastomer which is a copolymer of butadiene and a member selected from the group consisting of acrylonitrile and styrene in which the weight ratio of butadiene:acrylonitrile is in the range of 65:35 to 70:30 and the weight of ratio of butadiene:styrene is about 72:28 until the final resin contains from 1 to 25 percent by weight of (B) and a molar ratio of polymerized acrylonitrile:styrene of from 1.4:1 to 18:1 in it.

2. The process of claim 1 wherein the diene elastomer (B) is a copolymer of butadiene-1,3 and acrylonitrile in which the weight ratio of butadiene:acrylonitrile is in the range of 65:35 to 70:30.

3. The process of claim 2 wherein the polymerization is carried out in the substantial absence of oxygen at a temperature in the range of about 0° C. to about 100° C. and in the presence of a free radical initiator.

4. The process of claim 1 wherein the diene elastomer (B) is a copolymer of about 72 percent by weight of butadiene and about 28 percent by weight of styrene.

5. The process of claim 4 wherein the styrene is added continuously at a rate sufficient to maintain the specified acrylonitrile:styrene molar ratio, and the acrylonitrile:styrene molar ratio is determined by periodic analysis of the monomer composition in the polymerization medium by gas chromatographic analysis.

References Cited

UNITED STATES PATENTS 3,448,175    6/1969    Doak et al. _____ 260—880

FOREIGN PATENTS 794,400    4/1958    Great Britain _____ 260—880

JAMES A. SEIDLECK, Primary Examiner

204—159.15, 159.17; 260—2.5 R, 41.5 R, 879